(12) United States Patent
Litzenberger et al.

(10) Patent No.: US 8,110,054 B2
(45) Date of Patent: Feb. 7, 2012

(54) METHOD FOR CONNECTION AT LEAST TWO PIECES OF SHEET MATERIAL, PARTICULARLY AT LEAST TWO METAL SHEETS FOR A LIGHTWEIGHT STRUCTURE AS WELL A JOINING AND LIGHTWEIGHT STRUCTURE

(75) Inventors: Karsten Litzenberger, Buxtehude (DE); Marco Pacchione, Hamburg (DE); Alexei Vichniakov, Bahrendorf (DE)

(73) Assignee: Airbus Deutschland GmbH (DE)

( * ) Notice: Subject to any disclaimer, the term of this patent is extended or adjusted under 35 U.S.C. 154(b) by 438 days.

(21) Appl. No.: 11/989,188

(22) PCT Filed: Jul. 20, 2006

(86) PCT No.: PCT/EP2006/007167
§ 371 (c)(1),
(2), (4) Date: Jan. 18, 2008

(87) PCT Pub. No.: WO2007/009796
PCT Pub. Date: Jan. 25, 2007

(65) Prior Publication Data
US 2009/0263676 A1    Oct. 22, 2009

(30) Foreign Application Priority Data

Jul. 21, 2005  (DE) .......................... 10 2005 033 992

(51) Int. Cl.
*B32B 37/00* (2006.01)
(52) U.S. Cl. .................. 156/73.5; 156/153; 156/272.8; 156/304.3; 228/112.1; 428/58

(58) Field of Classification Search ................. 156/73.5, 156/94, 153, 272.2, 272.8, 304.1, 304.3, 156/580; 228/112.1, 2.1; 428/57, 58, 61
See application file for complete search history.

(56) References Cited

U.S. PATENT DOCUMENTS
4,156,054 A * 5/1979 Gurewitsch .................. 428/583
(Continued)

FOREIGN PATENT DOCUMENTS
DE           1876116 U        7/1963
(Continued)

OTHER PUBLICATIONS

Bremen, "Laser Beam Welding of High-strenght Aluminum Alloy in Aircraft Construction", 137(6); 34-38, 1995.

(Continued)

*Primary Examiner* — James Sells
(74) *Attorney, Agent, or Firm* — Lerner, David, Littenberg, Krumholz & Mentlik, LLP

(57) ABSTRACT

A method for connecting at least two sheet-like formations, in particular at least two metal sheets with a thin material thickness for aircraft, comprises establishing butt-joint connections between the sheet-like formations by forming a joining region; mechanical processing of the sheet-like formations and/or of the joining region; mechanical and/or chemical adhesive pre-treatment of the sheet-like formations and/or of the joining region; and pasting-on at least one reinforcement element in the region of the top and/or the bottom of the joining region, wherein for the purpose of forming a second load path the width of the at least one reinforcement element is wider than the width 16 of the joining region. A connection is provided and made according to the method. A lightweight structure is also provided that comprises at least one connection according to the invention.

23 Claims, 2 Drawing Sheets

U.S. PATENT DOCUMENTS

Figure 1:
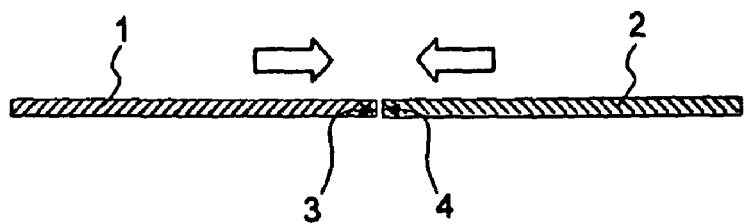

| | | | |
|---|---|---|---|
| 2001/0015043 A1 | 8/2001 | Brenneis et al. | |
| 2003/0217452 A1* | 11/2003 | Talwar et al. | 29/402.14 |

FOREIGN PATENT DOCUMENTS

| | | | |
|---|---|---|---|
| DE | 69819963 | T | 4/2004 |
| EP | 0604247 | T | 6/1994 |
| EP | 0882543 | T | 12/1998 |
| EP | 1291279 | | 3/2003 |
| EP | 1439121 | | 7/2004 |
| JP | 56102393 | A | 8/1981 |
| JP | 05212577 | A | 8/1993 |
| JP | 10192994 | A | 7/1998 |
| RU | 2155905 | C2 | 9/2000 |
| SU | 1680555 | A1 | 9/1991 |
| SU | 1290663 | A1 | 12/1996 |
| WO | 2005007507 | | 1/2005 |

OTHER PUBLICATIONS

International Search Report, pct/ep2006/007167.
Lapidus V.I. et al, Repair welding of wagons. Publishing house Transzheldorizdat 1935, pp. 152-153, fig. 210/1/.
Welder Journal, N 4, 2002, p. 37/1/.
Office Action from Russian Application No. 2008106470/02, dated Nov. 19, 2010.
Office Action from Japanese Application No. 2008-521898, dated Nov. 22, 2011.

* cited by examiner

METHOD FOR CONNECTION AT LEAST TWO PIECES OF SHEET MATERIAL, PARTICULARLY AT LEAST TWO METAL SHEETS FOR A LIGHTWEIGHT STRUCTURE AS WELL A JOINING AND LIGHTWEIGHT STRUCTURE

The invention relates to a method for connecting at least two sheet-like formations, in particular at least two metal sheets for a lightweight structure.

Furthermore, the invention relates to a connection between two sheet-like formations, in particular between two metal sheets for a lightweight structure, which connection has been formed according to the method according to the invention.

Moreover, the invention relates to a lightweight structure, in particular a fuselage cell, an airfoil, a horizontal or vertical tail unit of an aircraft or the like, formed from several joined shells and/or partial sections of a shell.

In particular in aircraft engineering, metal sheets are predominantly interconnected by means of rivet connections. As a rule, the seam area of such conventionally riveted connections comprises thickened regions in order to reduce seam stress that could otherwise lead to material fatigue. These thickened regions are, for example, produced by material removal, at least in parts, outside the seam area, for example by chemical etching methods, mechanical milling or the like.

In conventional rivet connections of metal sheets, the production of the required thickened regions in the seam area is very time-consuming and costly.

It is the object of the invention to create a method for producing a connection, as well as a connection between two sheets of a lightweight structure, in particular for a shell and/or part of a shell for forming a lightweight structure of an aircraft, in particular of a fuselage, an aerofoil, a horizontal or vertical tail unit or the like, which connection does not require any thickened regions in the seam area by means of expensive material removal outside the seam area, and which connection at the same time improves the static characteristics and damage-tolerance characteristics of the connection seam by creating an additional load path.

The object of the invention is met by a method with the characteristics described below.

The object of the invention is met by a method with the characteristics of claim 1.

The method, according to the invention, for connecting at least two sheet-like formations, in particular at least two metal sheets for a lightweight structure, comprises the following steps:

establishing butt-joint connections between the sheet-like formations by forming a joining region;

mechanical processing of the sheet-like formations and/or of the joining region;

mechanical and/or chemical adhesive pre-treatment of the sheet-like formations and/or of the joining region; and pasting-on at least one reinforcement element in the region of the top and/or the bottom of the joining region, wherein the width of the at least one reinforcement element is wider than a width of the joining region.

In this way two metal sheets can be interconnected without the need for material removal to take place outside the connection region, which material removal is otherwise necessary in particular to produce a local thickened region in the connection region in order to reduce mechanical stress, wherein the mechanical stress (in the seam region) is now reduced by pasting-on at least one reinforcement element. Consequently, in particular the danger of material fatigue occurring is reduced. Furthermore, as a result of the reinforcement element, whose width, for the purpose of achieving adequate overlap, is preferably wider than the width of the joining region, an additional load path is created as a result of the connection of both sheet-like formations.

As a result of the mechanical and/or chemical adhesive pre-treatment of the sheet-like formations and/or of the joining regions, improved adhesion of the at least one pasted on reinforcement element is achieved.

An advantageous embodiment of the invention provides for at least one further reinforcement element to be pasted onto at least one reinforcement element, at least in partial regions. In this way the mechanical loading capacity of the connection between the sheet-like formations can be increased.

According to an advantageous embodiment, joining the sheet-like formations takes place by friction stir welding, laser welding, fusion welding, soldering or the like. The above-mentioned joining methods (welding methods and soldering) generally make it possible to establish butt-joint connections of sheet-like formations, in particular in the form of metal sheets, with a thin material thickness.

A further advantageous embodiment of the method provides for the material thickness of the joining region after mechanical processing to be less than, or equal to, the material thickness of the sheet-like formations. This ensures support over almost the entire area of the reinforcement elements in the region of the joining region and of the sheet-like formations.

Furthermore, the invention may be for forming a connection between two sheet-like formations, in particular between two metal sheets for a lightweight structure, the sheet-like formations are butt-joint connected, and at least in the region of the top and/or the bottom of the joining region at least one reinforcement element is pasted on.

The connection according to the invention makes possible damage-tolerant connection of two sheet-like formations, in particular of two metal sheets, without requiring a thickened region by material removal that takes place outside the seam region, for example by means of chemical or mechanical removal (milling) or the like. Furthermore, pasting-on at least one reinforcement element creates an additional load path.

Furthermore, the object according to the invention may be met by a lightweight structure of an aircraft, in particular of a fuselage cell, an aerofoil, a horizontal or vertical tail unit formed from several joined shells and/or parts of a shell. According to the invention, at least two shells and/or at least two partial sections of at least one shell are joined to form the lightweight structure by means of at least one connection.

Further advantageous embodiments of the arrangement are shown in the further claims.

Figure 2:
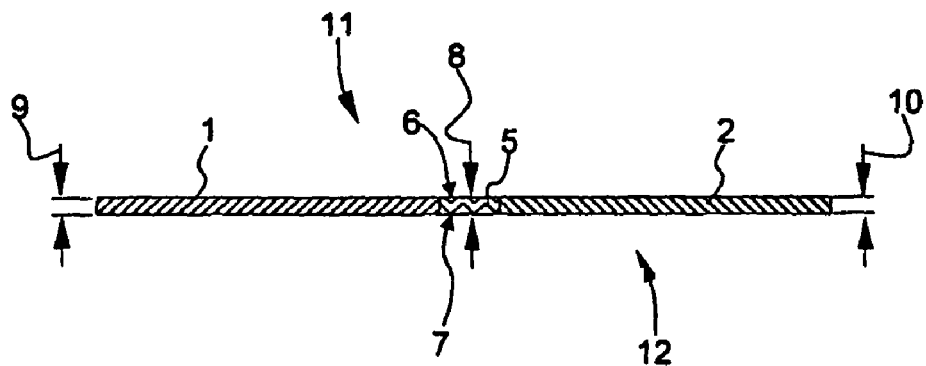
Figure 3:
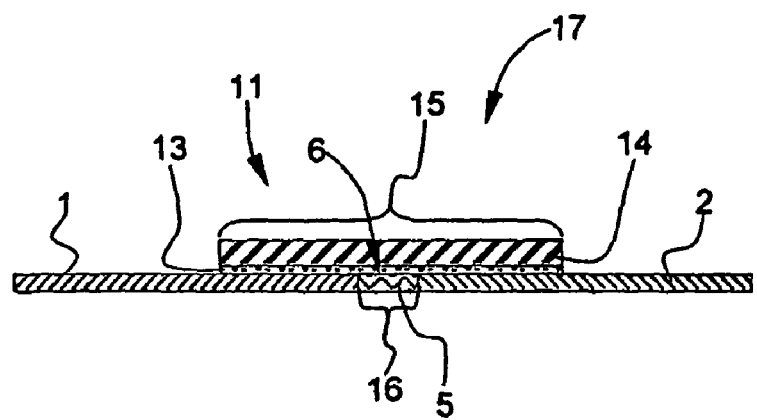
Figure 4:
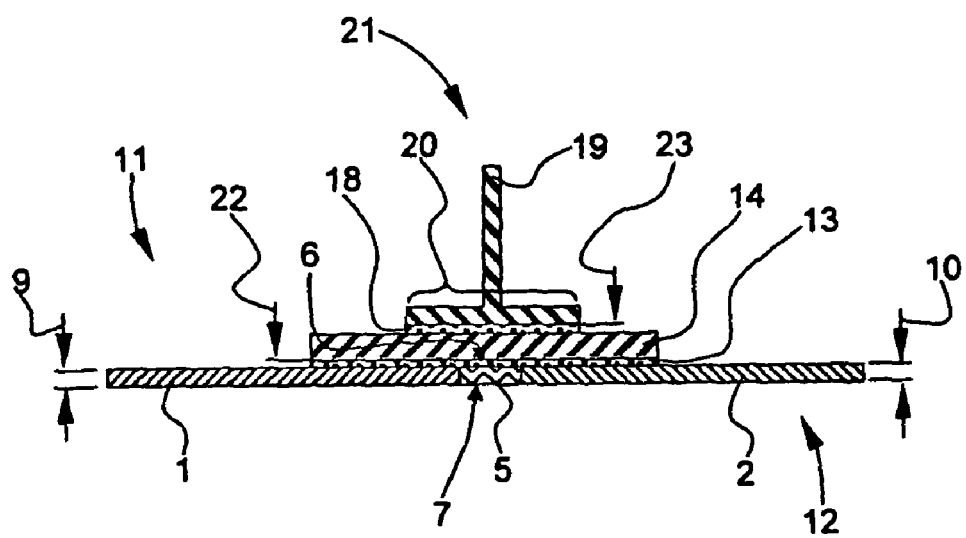

The drawings show the following:

FIG. 1 a cross-sectional view of two metal sheets prior to a first method-related step;

FIG. 2 a cross-sectional view of two metal sheets, connected by means of a joining region, after a first method-related step;

FIG. 3 a cross-sectional view of a joining region with a pasted-on reinforcement element, after further process-related steps; and FIG. 4 a connection produced according to the method, which connection comprises two pasted-on reinforcement elements.

Identical structural elements in the drawings have the same reference characters. To explain the method according to the invention and a connection established by means of the method, overall reference is made to FIGS. 1 to 4.

To implement the method, as shown in FIG. 1, in a first method-related step, for example, two metal sheets 1, 2 as sheet-like formations are aligned relative to each other so that they abut, i.e. along longitudinal edges 3, 4 that are opposite each other at the face. Depending on the selected joining process, the regions of the longitudinal edges 3, 4 are correspondingly pre-treated. Pre-treatment takes place, for example, by means of chemical or mechanical pre-treatment of the surfaces and/or of the longitudinal edges 3, 4, by mechanical removal along the longitudinal edges 3, 4 or by similar pre-treatment processes.

In a second method-related step the metal sheets 1, 2 are then, as shown in FIG. 2, finally joined along the longitudinal edges 3, 4 (compare FIG. 1) thereby forming a joining region 5. In this process the longitudinal edges 3, 4 are incorporated into the joining region 5, and in FIGS. 2 to 4 thus no longer have reference characters. Joining the metal sheets 1, 2 in the direction of the two arrows can, for example, take place by fusion welding, in particular by laser welding or the like, wherein at least partial melting-on of the metal sheets 1, 2 in the joining region 5 then takes place. As an alternative, joining can also take place without melting-on of the metal sheets 1, 2, for example by friction stir welding, soldering or the like. As a result of joining, the joining region 5 is created. The method according to the invention is not to be interpreted as being limited to the connection of metal sheets 1, 2. Instead, other materials can also be interconnected by any desired joining process.

In a third method-related step the top 6 and/or the bottom 7 are/is subjected, at least in some regions, to mechanical and/or chemical processing, for example by grinding, milling, planing, stripping or the like. Due to processing, the material thickness 8 of the joining region 5 is reduced.

In an intermediate step, if need be a top 11 and a bottom 12 of the metal sheets 1, 2 and/or the top 6 and/or the bottom 7 of the joining region 5 can additionally be provided with corrosion protection. If required, in a further intermediate step, the regions mentioned can additionally be subjected to adhesive pre-treatment so as to improve adhesion. Improved adhesion can, for example, be achieved by the application of bonding agents, primers, etching methods or the like.

In a fourth method-related step, as shown in FIG. 3, an adhesive layer 13 is first applied to the top 6 of the joining region 5 and to the adjoining top 11 of the metal sheets 1, 2 and/or to a bottom of the stiffening element 14. In this arrangement the adhesive layer 13 can be an adhesive film, adhesive foil, liquid adhesive or the like. Subsequently a reinforcement element 14 for bonding is applied to the adhesive layer 13. In the exemplary embodiment shown, the reinforcement element 14 is a flat profile (solid material) or a metal strip with an essentially rectangular cross-sectional geometry. In a manner that differs from the above, the reinforcement elements used can be reinforcement profiles with almost any cross-sectional geometry, in particular with a T-shaped, L-shaped, U-shaped, Z-shaped cross-sectional geometry or the like for reinforcing the joining region 5. Moreover, the reinforcement element 14 can be formed by a rectangular hollow profile, a flat profile (solid material), line- and curve-shaped metal strips or the like with an essentially rectangular cross-sectional geometry, which entirely or at least partly cover the course of the seam.

The reinforcement element 14 or the reinforcement elements can also be formed with a composite material, for example with a fibre-reinforced epoxy resin or the like. Furthermore, the reinforcement elements 14 can be formed with a fibre-reinforced polyester resin, phenolic resin or BMI resin. In particular any organic and/or inorganic fibres, staple fibres or whisker fibres are suitable as reinforcement fibres. For example carbon fibres, glass fibres, Aramide fibres or the like can be used as reinforcement fibres.

The reinforcement element 14 is, for example, pasted together with the metal sheets 1, 2 or the joining region 5 by means of a duroplastic plastic material that can be cured by cross-linking, in particular an epoxy resin, a phenolic resin, a polyester resin, a BMI resin or the like as an adhesive. If need be fibre reinforcement, for example using carbon fibres, glass fibres, Aramide fibres or the like, can be embedded in the adhesive. Instead of a duroplastic plastic material as an adhesive means, it is also possible to use an adhesive means with a thermoplastic or some other base.

In this arrangement a width 15 of the reinforcement element 14 is preferably wider than a width 16 of the joining region 5, so as to achieve adequate overlap for connecting the metal sheets 1, 2 to the reinforcement element 14. In this way the metal sheets 1, 2 are interconnected on the one hand by the joining region 5. On the other hand, furthermore, the reinforcement element 14 forms a second load path.

In this arrangement a width 15 of the reinforcement element 14 is preferably wider than a width 16 of the joining region 5, so as to achieve adequate overlap for connecting the metal sheets 1, 2 to the reinforcement element 14. In this way the metal sheets 1, 2 are interconnected on the one hand by the joining region 5. On the other hand, furthermore, the reinforcement element 14 forms a second load path, which is aligned transversely to the joining region 5, which second load path, among other things, makes possible a reduction in seam stress that among other things can result in fatigue fractures. Moreover, the reinforcement element 14 provides redundancy because in the case of mechanical failure of the joining region 5, no complete fracture of the connection 17, formed by means of the method according to the invention, occurs (as yet).

FIG. 4 shows a variant of the method according to the invention, in which in a same or in an additional method-related step, by means of a further adhesive layer 18, a further reinforcement element 19 with a width 20 is pasted on the reinforcement element 14. In this process the reinforcement element 19 is designed as a reinforcement profile, in particular as a stringer or the like. Any of the commonly used stringer profile shapes are suitable as a reinforcement element 19. By means of the additional reinforcement element 19, the mechanical stability of a connection 21 formed according to this variant of the method according to the invention can be improved.

With reference to FIG. 4, furthermore, the basic design of a connection, formed by means of the method according to the invention, between two sheet-like formations, in particular between metal sheets 1, 2, is to be explained in more detail.

The metal sheets 1, 2 are interconnected by means of the joining region 5. Connecting the metal sheets 1, 2 or forming the joining region 5 takes place, for well as the top 11 and the bottom 12 of the metal sheets 1, 2 are subjected to suitable after treatment, for example by grinding, milling, planing, stripping or the like. Furthermore, it may be necessary to additionally provide the above-mentioned regions with corrosion protection, and if need be to carry out pre-treatment to improve adhesion, in particular to improve adhesion of the adhesive layer 13. By means of the adhesive layer 13 the reinforcement element 14 in the form of a flat profile with an essentially rectangular cross section is pasted, preferably over the entire area, onto the joining region 5 and the regions of the top 11 of the metal sheets 1, 2, which regions adjoin on both sides. One width 15 of the reinforcement element 14 is considerably wider than a width 16 of the joining region 5 (compare FIG. 2) in order to achieve adequate overlap for connecting the metal sheets 1, 2. A material thickness 22 of the adhesive layer 13 is significantly thinner than the material thickness 8 of the joining region 5 (compare FIG. 2) and thinner than the material layer 9, 10 of the metal sheets 1, 2. By means of the further adhesive layer 18 with a material thickness 23 the reinforcement element 19 is pasted together with the reinforcement element 14, preferably over the entire area.

Applying the further reinforcement element 19 is not mandatory. It may be sufficient to connect the metal sheets 1, 2 by means of the joining region 5 along the longitudinal edges 3, 4 at the face, and subsequently to paste the reinforcement element 14 by means of the adhesive layer 13 onto the metal sheets 1, 2 and onto the joining region 5 (compare FIG. 3). Instead of the reinforcement element 14 shown in FIG. 3 in the form of a flat profile or metal strip with an essentially rectangular cross-sectional geometry, it is also possible to paste a reinforcement element with some other cross-sectional geometry onto the joining region 5 and onto the adjoining metal sheets 1, 2. In principle, the reinforcement elements can be formed using profiles with almost any desired cross-sectional geometries, in particular with a T-shaped, an L-shaped, a U-shaped, a Z-shaped cross-sectional geometry or the like.

Furthermore, it is possible to paste reinforcement elements onto the top 11 and/or the bottom 12 of the metal sheets 1, 2 and the top 6 and/or the bottom 7 of the joining region 5.

The adhesive layers 13, 18 are formed with an a curable epoxy resin, a phenolic resin, a polyester resin, a BMI resin or the like, which if need be can comprise fibre reinforcement with carbon fibres, glass fibres, Aramide fibres or the like. As an alternative the adhesive layers 13, 18 can also be formed with a thermoplastic adhesive material.

The metal sheets 1, 2 can be formed with aluminium or with an aluminium alloy, for example an Al—Cu alloy, an Al—Zn alloy, an Al—Li alloy, an Al—Mg—Sc alloy or the like. Furthermore, the metal sheets can be formed with magnesium, with a magnesium alloy, with titanium, with a titanium alloy, with steel, with a steel alloy, or the like. Furthermore, the metal sheets 1, 2 can be formed with any desired combination of the above-mentioned metals or metal alloys. The method can be applied with metal sheets 1, 2 of any desired material thickness, preferably however for metal sheets 1, 2 of a material thickness of between 0.2 mm and 10 mm.

The reinforcement elements 14, 19 can also be formed with aluminium or with an aluminium alloy, for example an Al—Cu alloy, an Al—Zn alloy, an Al—Li alloy, an Al—Mg—Sc alloy or the like. Furthermore, the reinforcement elements 14, 19 can be formed with magnesium, with a magnesium alloy, with titanium, with a titanium alloy, with steel, with a steel alloy or the like. Moreover, the reinforcement elements 14, 19 can be formed with any desired combination of the above-mentioned metals or metal alloys.

The reinforcement elements 14, 19 can also be formed with composite materials, for example with fibre-reinforced epoxy resins. Furthermore, fibre-reinforced phenolic resins, polyester resins, BMI resins or the like can also be used. Any organic and inorganic fibres, staple fibres or whisker fibres can be used as reinforcement fibres.

The reinforcement elements 14, 19 can also be formed with metal-matrix composite materials, for example with an aluminium- or magnesium matrix. Furthermore, titanium alloys or the like can also be used as a matrix. Again, any organic and inorganic fibres, staple fibres or whisker fibres can be used as reinforcement fibres.

If need be the reinforcement elements 14, 19 can be designed as a sandwich structure, for example in the form of a core structure (honeycomb, folded sheet or the like) with a suitable plastic material that on each sides comprises a cover layers made from an aluminium alloy or magnesium alloy.

The metal sheets 1, 2 to be joined can, for example, be a shell and/or partial sections of a shell of a lightweight structure, in particular a fuselage cell, an aerofoil, a horizontal or vertical tail unit of an aircraft or the like so that by means of the method according to the invention or by means of the connection according to the invention the shells and/or the parts of the shells can be joined to form one of the mentioned lightweight structures in particular of an aircraft.

LIST OF REFERENCE CHARACTERS

1 Metal sheet
2 Metal sheet
3 Longitudinal edge
4 Longitudinal edge
5 Joining region
6 Top (joining region)
7 Bottom (joining region)
8 Material thickness (joining region)
9 Material thickness (metal sheet)
10 Material thickness (metal sheet)
11 Top (metal sheets)
12 Bottom (metal sheets)
13 Adhesive layer
14 Reinforcement element
15 Width (reinforcement element)
16 Width (joining region)
17 Connection
18 Adhesive layer
19 Reinforcement element
20 Width (reinforcement element)
21 Connection
22 Material thickness (adhesive layer)
23 Material thickness (adhesive layer)

The invention claimed is:

1. A method for connecting at least two metal sheets for a lightweight structure, comprising:
    joining the metal sheets as butt joint connections by forming a joining region; then
    mechanical processing of a top or bottom of the joining region, thereby reducing a material thickness of the joining region; then
    mechanical or chemical adhesive pre-treatment of the metal sheets or of the joining region; and then
    pasting-on at least one reinforcement element, which creates an additional load path, in the region of the top or of the bottom of the joining region, the at least one reinforcement element having a width being wider than the width of the joining region, and abutting over the entire area.

2. The method of claim 1, wherein at least one further reinforcement element is pasted onto at least one reinforcement element, at least in partial regions.

3. The method of claim 1, wherein joining the metal sheets takes place by one of friction stir welding, laser welding, fusion welding, or soldering.

4. The method of claim 1, wherein the material thickness of the joining region after mechanical processing is less than, or equal to, the material thickness of the metal sheets.

5. The method of claim 1, wherein the at least one reinforcement element is pasted on by at least one of a duroplastic plastic material, a phenolic resin, a polyester resin, and a BMI resin.

6. The method of claim 1, wherein the at least one reinforcement element is designed as reinforcement profiles, in particular as at least one of T-profiles, L-profiles, U-profiles, Z-profiles, rectangular profiles, flat profiles, and metal strips.

7. The method of claim 1, wherein the at least one reinforcement element is formed with a metal material, in particular with at least one of aluminium, an aluminium alloy, titanium, a titanium alloy, steel, and a steel alloy.

8. The method of claim 1, wherein the at least one reinforcement element is formed with a composite material, in particular with a fibre-reinforced plastic material.

9. The method of claim 1, wherein the metal sheets are formed with a material thickness of between 0.2 mm and 10 mm.

10. The method of claim 1, wherein the metal sheets are formed with at least one of aluminium, an aluminium alloy, titanium, a titanium alloy, steel, and a steel alloy.

11. A connection between at least two metal sheets for a lightweight structure, formed according to the process of claim 1, wherein the metal sheets are butt-joint connected by a joining region, and at least in the region of at least one of a top and a bottom of the joining region at least one reinforcement element that is abutting over the entire area is pasted on, wherein the width, of the at least one reinforcement element is wider than a width of the joining region so as to, by means of an overlap, create an additional load path.

12. The connection of claim 11, wherein at least one further reinforcement element is pasted onto at least one reinforcement element, at least in partial regions.

13. The connection of claim 11, wherein a material thickness of the joining region is less than, or equal to, a material thickness of the metal sheets.

14. The connection of claim 11, wherein the at least one reinforcement element is pasted on by means of at least one adhesive layer, wherein a material thickness of the at least one adhesive layer is thinner than at least one of the material thickness of the sheet-like formations and the material thickness of the joining region.

15. The connection of claim 11, wherein the at least one reinforcement element is formed with reinforcement profiles, in particular with at least one of T-profiles, L-profiles, U-profiles, Z-profiles, rectangular profiles, flat profiles, and metal strips.

16. The connection of claim 11, wherein the at least one reinforcement element is formed with a metal material, in particular with at least one of aluminium, an aluminium alloy, titanium, a titanium alloy, steel, and a steel alloy.

17. The connection of claim 11, wherein the at least one reinforcement element is formed with a composite material, in particular with a fibre-reinforced plastic material.

18. The connection of claim 11, wherein the metal sheets comprise a material thickness of between 0.2 mm and 10 mm.

19. The connection of claim 11, wherein the metal sheets are formed with at least one of aluminium, an aluminium alloy, titanium, a titanium alloy, steel, and a steel alloy.

20. The connection of claim 11, wherein the at least one adhesive layer is formed with a duroplastic plastic material, in particular with at least one of an epoxy resin, a polyester resin, and a BMI resin.

21. The connection of claim 11, wherein in each case the metal sheets form at least a partial section of a shell for a component of an aircraft, in particular a fuselage cell of an aircraft.

22. A lightweight structure, comprising: several joined shells or partial sections of a shell, wherein at least two shells or at least two partial sections of at least one shell are joined to form the lightweight structure by a connection wherein the shells are butt-joint connected by a joining region, and then mechanically processed to reduce the thickness of the joint area, and at least in the region of at least one of a top and a bottom of the joining region at least one reinforcement element that is abutting over the entire area is pasted on, wherein the width of the at least one reinforcement element is wider than a width of the joining region so as to, by means of an overlap, create an additional load path.

23. The lightweight structure of claim 22, wherein the joining region is formed by at least one of stir welding, laser welding, fusion welding, or soldering.

* * * * *